United States Patent
Rathbone

(10) Patent No.: US 10,938,796 B2
(45) Date of Patent: *Mar. 2, 2021

(54) ACCESS KEY RETRIEVAL SERVICE FOR CLIENTS

(71) Applicant: Amazon Technologies, Inc., Seattle, WA (US)

(72) Inventor: Doug Rathbone, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/443,745

(22) Filed: Jun. 17, 2019

(65) Prior Publication Data

US 2020/0045032 A1 Feb. 6, 2020

Related U.S. Application Data

(63) Continuation of application No. 15/385,819, filed on Dec. 20, 2016, now Pat. No. 10,326,746.

(51) Int. Cl.
*H04L 29/06* (2006.01)

(52) U.S. Cl.
CPC .......... *H04L 63/062* (2013.01); *H04L 63/068* (2013.01); *H04L 63/10* (2013.01)

(58) Field of Classification Search
CPC ..... H04L 63/062; H04L 63/068; H04L 63/08; H04L 63/10; G06F 21/31; G06F 21/44
See application file for complete search history.

(56) References Cited

U.S. PATENT DOCUMENTS

| | | | | |
|---|---|---|---|---|
| 7,072,807 B2 * | 7/2006 | Brown | ...................... | G06F 8/20 703/1 |
| 7,536,554 B2 * | 5/2009 | Haff | ....................... | H04L 29/06 713/176 |
| 7,571,489 B2 * | 8/2009 | Ong | ....................... | G06F 21/34 726/29 |
| 7,657,885 B2 | 2/2010 | Anderson | | |
| 7,814,023 B1 | 10/2010 | Rao et al. | | |
| 8,126,814 B2 | 2/2012 | Yellai et al. | | |
| 8,332,647 B2 * | 12/2012 | Bradley, II | .......... | H04L 63/0823 713/176 |
| 8,583,559 B2 | 11/2013 | Nakashima | | |
| 8,607,224 B2 | 12/2013 | Kohler et al. | | |
| 9,009,239 B1 * | 4/2015 | Braytenbaum | ......... | H04L 51/36 709/206 |

(Continued)

*Primary Examiner* — Hosuk Song

(74) *Attorney, Agent, or Firm* — Davis Wright Tremaine LLP

(57) ABSTRACT

An access key retrieval service receives a request from a client device to configure an application on the client device. In response to the request, the access key retrieval service provides a setup code comprising a first component of an authentication key. Additionally, the access key retrieval service provides files for configuring the application, including a manifest file that includes a second component of the authentication key. The client device uses a set of key components that comprises the first component and the second component to derive the authentication key and provides information demonstrating access to the authentication key. The access key retrieval service receives this information and provides an access key usable to enable the application to access computing resources of a service provider.

20 Claims, 10 Drawing Sheets

(56) References Cited

U.S. PATENT DOCUMENTS

| | | | |
|---|---|---|---|
| 10,326,746 B1* | 6/2019 | Rathbone | .............. H04L 63/062 |
| 10,356,214 B2* | 7/2019 | Joshi | ....................... H04L 67/34 |
| 2011/0055555 A1 | 3/2011 | Michaelis et al. | |
| 2018/0114197 A1 | 4/2018 | Morris et al. | |

* cited by examiner

ACCESS KEY RETRIEVAL SERVICE FOR CLIENTS

CROSS REFERENCE TO RELATED APPLICATION

This application is a continuation of U.S. patent application Ser. No. 15/385,819, filed Dec. 20, 2016, now U.S. Pat. No. 10,326,746, entitled "ACCESS KEY RETRIEVAL SERVICE FOR CLIENTS," the disclosure of which is hereby incorporated herein in its entirety.

BACKGROUND

Customers of a computing resource service provider or other service providers often utilize their client devices to access various computing resources and services provided by these service providers. For instance, customers of a computing resource service provider may configure their client development environments and applications to access the services provided by the computing resource service provider to satisfy their business or other needs. To enable customers to connect their client development environments and applications to these services and computing resources, the computing resource service provider provides various methods for creating access keys and secrets for accessing these services and computing resources. However, the process of creating these access keys and secrets can be confusing and error prone, which can result in mistakes that can delay or prevent customers from being able to access the computing resources and services provided by the service provider through their client development environments and applications.

BRIEF DESCRIPTION OF THE DRAWINGS

Various techniques will be described with reference to the drawings, in which.

DETAILED DESCRIPTION

Figure 1:
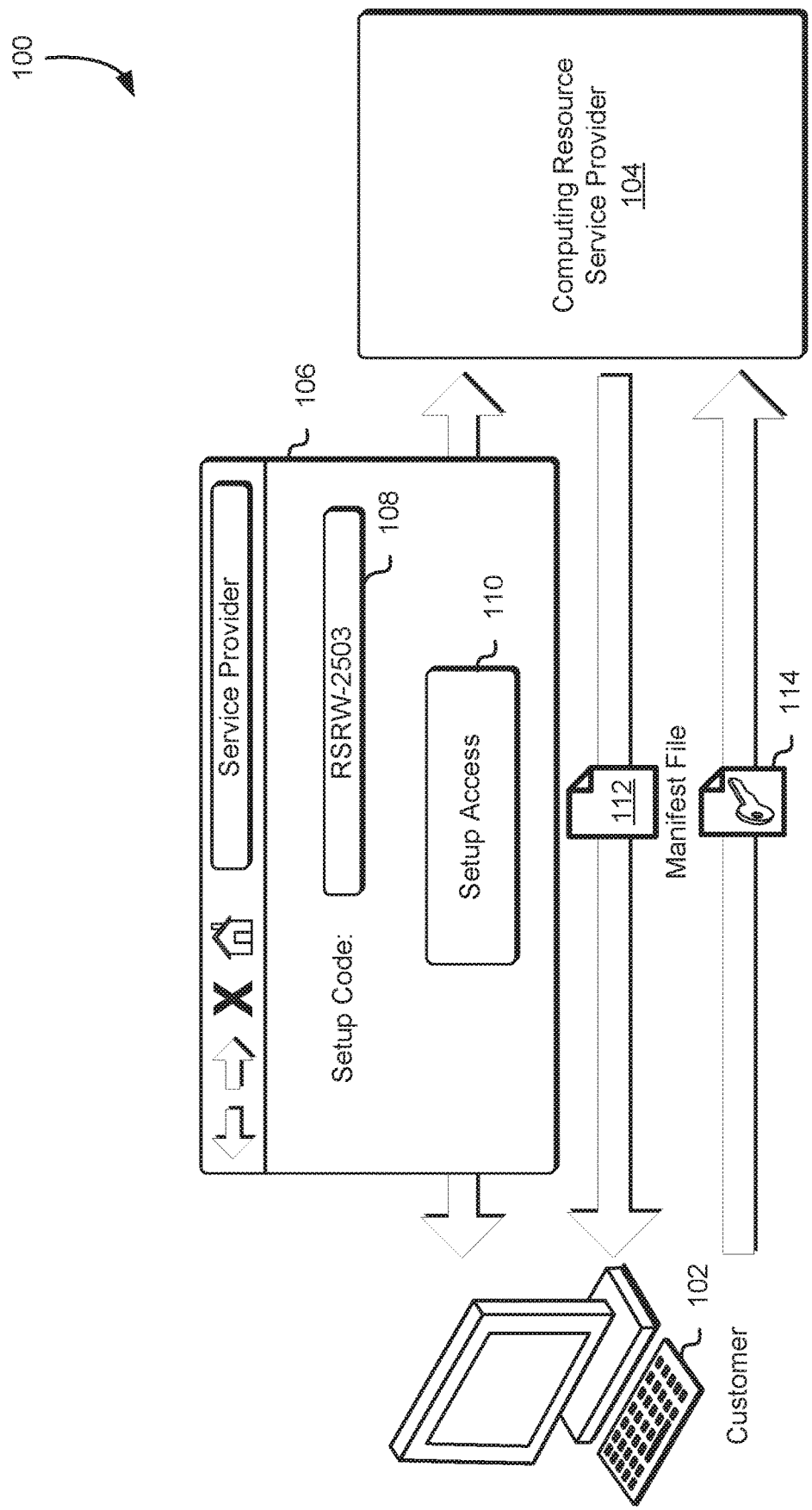
FIG. 1 shows an illustrative example of an environment in which various embodiments can be implemented.

This disclosure relates to an access key retrieval service that can authenticate customer client devices and environments and obtain access keys and secrets on behalf of customers to enable customers to utilize their client devices and environments to access computing resources and services provided by a computing resource service provider. In an example, a customer, through a client device, transmits a request to an access key retrieval service to obtain a manifest file and other files or applications that can be installed on the customer's client device to support a local development environment or other applications on the customer's client device. The access key retrieval service may be associated with a graphical user interface (GUI), which customers can interact with to select the applications, resources, or files that the customer would like to use to support its local development environment or applications. Through the GUI, the access key retrieval service may display to the customer a setup code that the customer may provide as part of a setup process for enabling its local development environment or other applications to access computing resources and services of the computing resource service provider. In some examples, the setup code is a one-time code comprising various characters. This setup code may have a short-duration (e.g., a few minutes, etc.) such that the setup code may expire if not utilized within an expiration period defined by the access key retrieval service. Additionally, the setup code may serve as a component of a cryptographic key that may be used to authenticate the customer as the customer utilizes the manifest file and other files on its client device. The other component of the cryptographic key may be included in the manifest file downloaded to the customer's client device.

In an example, in response to receiving the manifest file from the access key retrieval service, the local development environment or other application on the customer's client device will evaluate the manifest file and initiate setup of the files or applications provided with the manifest key by the access key retrieval service. Additionally, the local development environment or other application may prompt the customer, through the client device, to provide the setup code provided by the access key retrieval service. If the customer provides the setup code to the local development environment or other application, it may combine the setup code and the component of the cryptographic key in the manifest file to generate a cryptographic key that may be used to authenticate the customer. The local development environment or other application may transmit the cryptographic key to the access key retrieval service for authentication of the customer and the local development environment installed on the client's device.

In response to receiving the cryptographic key from the customer's client device, the access key retrieval service may evaluate the cryptographic key to determine whether it is valid. For instance, the access key retrieval service may determine whether the setup code or the manifest file previously provided to the customer has expired. If either the setup code or the manifest file used to generate the cryptographic key has expired, the access key retrieval service may determine that the cryptographic key is not valid and reject the cryptographic key. Additionally, the access key retrieval service may perform a process for invalid cryptograph keys. This may include transmitting a new manifest file to the client device and presenting, through the GUI, a new setup code to the customer. Alternatively, the access key retrieval service may terminate the connection with the customer, thereby causing the customer to re-initiate the process of connecting its local development environment or other applications to the computing resource service provider and its services or computing resources.

If the cryptographic key provided by the client device is valid, the access key retrieval service may transmit a request to an identity management service of the computing resource service provider to obtain an access key or secret for the client device. In response to receiving the access key or secret from the identity management service, the access key retrieval service may transmit the access key or secret to the customer client device. This may cause the customer client device to utilize the access key or secret along with the local development environment or other application to access a computing resource service or other computing resource provided by the computing resource service provider. The identity management service of the computing resource service provider may evaluate the access key or secret from the local development environment or other application installed on the customer client device to authenticate the customer and to determine whether the customer is authorized to utilize the local development environment or application to access the requested computing resource service or other computing resource of the computing resource service provider.

In this manner, a customer may obtain access keys or secrets for its local development environments or applications for accessing computing resource services and computing resources of a computing resource service provider without need to manually create these access keys and secrets. In addition, the techniques described and suggested in this disclosure enable additional technical advantages. For instance, because the setup code presented through the GUI and the manifest file expire after a short period of time, this may prevent manipulation or spoofing of the cryptographic key usable for authentication of the customer client device. Additionally, because the access key retrieval service retrieves the access key or secret from the identity management service, the customer computer client may utilize the access key or secret to access the computing resource service provider services and computing resources without need to manipulate the access key or secret.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a customer of a computing resource service provider 104 may transmit a request to an access key retrieval service to obtain a manifest file and other files that may be used to install or configure one or more applications for use on a client device 102 to access computing resources and services provided by the computing resource service provider 104. In order for the customer to interact with the access key retrieval service of the computing resource service provider 104, the customer may be required to provide credential information for authentication to a graphical user interface (GUI) 106, whereby the GUI 106 may utilize the provided credential information to authenticate the customer. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like. The computing resource service provider 104 may utilize the obtained credential information from the GUI 106 to authenticate the customer.

If the customer is successfully authenticated by the computing resource service provider 104, the access key retrieval service may update the GUI 106 to present the customer with an option to download, on to the customer client device 102, a manifest file 112 and other files that may be used to install one or more applications on their local development environment. The manifest file 112 may include metadata corresponding to the accompanying files that may be used to install the one or more applications on to the local development environment on the customer client device 102. Additionally, the manifest file 112 may describe the name, version number, files, and other information that may constitute the one or more applications included in the accompanying files provided by the access key retrieval service. In an embodiment, the manifest file 112 includes a header comprising a component of a cryptographic key that can be used for authentication of the customer client device 102. The component of the cryptographic key may be insufficient to be usable for authentication of the customer client device 102. The component of the cryptographic key specified in the manifest file 112 may be combined with another component of the cryptographic key, as described below, to generate the cryptographic key 114 usable to authenticate the customer client device 102. For instance, the access key retrieval service may rely on one or more secret sharing schemes to enable the customer client device 102 to derive the cryptographic key 114 from the component of the cryptographic key provided in the manifest file 112 and the other component of the cryptographic key provided by the access key retrieval service. Example secret sharing schemes may include Shamir's scheme, Blakley's scheme, the Chinese remainder theorem, and the like. Alternatively, the derivation of the cryptographic key 114 may include a concatenation of bits of the components of the cryptographic key. Other methods may be used for derivation of the cryptographic key 114. In some instances, the cryptographic key 114 can be derived using a hash function (e.g., keyed-hash message authentication code (HMAC), etc.) that utilizes the component of the cryptographic key specified in the manifest file 112 and the setup code 108 described below as input. The cryptographic key 114 may be derived by hashing the concatenation of bits of the components of the cryptographic key. As another example, the cryptographic key 114 may be derived using a bitwise operation of the components of the cryptographic key. Another method may include using any non-identity function of inputs that includes the components of the cryptographic key to derive the cryptographic key 114.

In an embodiment, the access key retrieval service includes, in the GUI 106, a setup code 108, which may comprise one or more characters that may be used as a component of the cryptographic key that, when combined with the component of the cryptographic key specified in the manifest file 112 according to a secret sharing scheme or other combination mechanism, may result in derivation of the cryptographic key 114. The setup code 108 may be active for a particular period of time such that the setup code 108 may expire as a result of the period of time having elapsed. The setup code 108 may be randomly generated by the access key retrieval service. Alternatively, the access key retrieval service may generate the cryptographic key 114 and utilize a secret sharing scheme or other algorithm to decompose the cryptographic key 114 into the setup code 108 and the component of the cryptographic key to be included in the header of the manifest file 112.

The GUI 106 may further include a setup access button 110, which, if selected by the customer through the GUI 106, may cause the access key retrieval service to generate the manifest file 112 and include, within the manifest file 112, a component of the cryptographic key that, if combined with the setup code 108, is used to derive the cryptographic key 114. In some embodiments, the access key retrieval service stores a copy of the cryptographic key 114 or other information that can be used to determine whether the customer has access to the cryptographic key 114. This copy of the cryptographic key 114 or other information may expire at the same time as the setup code 108 presented on the GUI 106. The access key retrieval service may transmit the manifest file 112 and other files usable for configuration of applications requested by the customer to the customer client device 102. In response to receiving the manifest file 112 and the other files, the local development environment on the customer client device 102 may alert the customer regarding configuration of the one or more applications. For instance, the local development environment may present the customer, through the customer client device 102, with a second GUI that may be used to setup the one or more applications that can access the computing resource services and computing resources of the computing resource service provider 104.

Through the GUI 106 presented to the customer through the customer client device 102, the local development environment may prompt the customer to provide the setup code 108 presented to the customer through the GUI 106 of the access retrieval key service. In response to receiving the setup code 108 from the customer, the local development environment may obtain the component of the cryptographic key from the manifest file 112 and combine this component of the cryptographic key with the setup code 108 according to a secret sharing scheme described above or other combination method (e.g., combining of bits, etc.) to derive the cryptographic key 114. The local desktop environment of the customer client device 102 may transmit the cryptographic key 114 or information that cryptographically proves that the customer has access to the cryptographic key 114 (e.g., digital signature generated using the cryptographic key 114, a hash of the cryptographic key 114, etc.) to the access key retrieval service.

In response to receiving the cryptographic key 114 or the information that can be used to cryptographically prove that the customer has access to the cryptographic key 114, the access key retrieval service may determine whether the provided cryptographic key 114 or information is valid. For instance, the access key retrieval service may retrieve its copy of the cryptographic key 114 and compare it to the provided cryptographic key 114 to determine whether the keys are identical. If so, the access key retrieval service may determine that the cryptographic key 114 is valid. Additionally, or alternatively, the access key retrieval service may determine whether the setup code 108 or manifest file 112 used to generate the cryptographic key 114 has expired. As described above, the setup code 108 and the manifest file 112 may each be subject to a pre-defined (e.g., defined through the configuration of the access key retrieval service) expiration period. Thus, if the expiration period has elapsed for the setup code 108 or the manifest file 112, the access key retrieval service may determine that the setup code 108 or the manifest file 112 has expired. If either the setup code 108 or the manifest file 112 has expired, the access key retrieval service may determine that any cryptographic key generated using either the setup code 108 and/or the manifest file 112 is invalid.

If the access key retrieval service determines that the provided cryptographic key 114 or information that can be used to cryptographically prove that the customer has access to the cryptographic key 114 is valid, the access key retrieval service may transmit a request to an identity management service of the computing resource service provider 104 to obtain an access key or secret that can be used by the customer client device 102 to access computing resource services and computing resources of the computing resource service provider 104. The identity management service may maintain one or more computing resource policies for customers of the computing resource service provider 104 and may maintain an account for each customer. In an embodiment, a user of a customer account with privileges for modifying permissions and/or for modifying a set of policies (e.g., an administrator or such other user with privileges for modifying a set of policies, also referred to herein as a "privileged user") of an organization may communicate with the identity management service using one or more application programming interface (API) calls to request creation of policies, editing of policies, or deletion of policies. Such policy modification activities (e.g., creating and editing) may also be referred to herein as "authoring" a policy. The policies may, for example, be utilized to establish, for one or more users of the customer account, a level of access to one or more resources provisioned by or for the organization and, generally, access rights with respect to the one or more resources provisioned by/for the organization. The organization may be a user of a computing resource service provider 104 that utilizes one or more services such as a virtual computer system service, object-based data storage services, database services, a policy management service and configuration and management service as well as a plurality of other services to create and manage resources and to support operational needs.

The access key or secret may comprise credential information that may include, among other things, a username, a corresponding password, biometric information, a cryptographic key, a unique identifier, a set of credentials, a hash of the set of credentials, a digital signature generated using a credential, a message authentication code generated based at least in part on a credential, and the like. The access key or secret may also include a cryptographic key. For instance, the access key or secret may comprise a symmetric cryptographic key that is shared between the identity management service and the customer client device 102. The identity management service, therefore, may use a copy of the symmetric cryptographic key to verify digital signatures of requests purported to have been generated by the applications installed on the customer client device 102. However, in other embodiments, the identity management service may be configured to utilize asymmetric cryptography for authentication and authorization such as, for example, in response to the customer client device 102 digitally signing requests using a private cryptographic key. In such embodiments, the identity management service may be configured to trust a certificate authority that digitally signed a certificate of the customer client device 102 corresponding to the private cryptographic key. Consequently, in some embodiments, the identity management service may use a public cryptographic key specified by the certificate.

The access key or secret may be associated with the customer's account managed by the computing resource service provider 104. Thus, if the access key or secret is utilized by the customer client device 102 for authentication and authorization, the identity management service may utilize the access key or secret to determine whether the customer client device 102 can be authenticated. If so, the identity management service may identify one or more policies applicable to the customer account to determine whether the customer client device 102 is authorized to perform the requested actions. If so, the identity management service may enable the customer client device 102 to perform the requested actions. However, if the customer client device 102 is not authorized to perform the requested actions, the identity management service may cause the request from the customer client device 102 to be denied.

Figure 2:
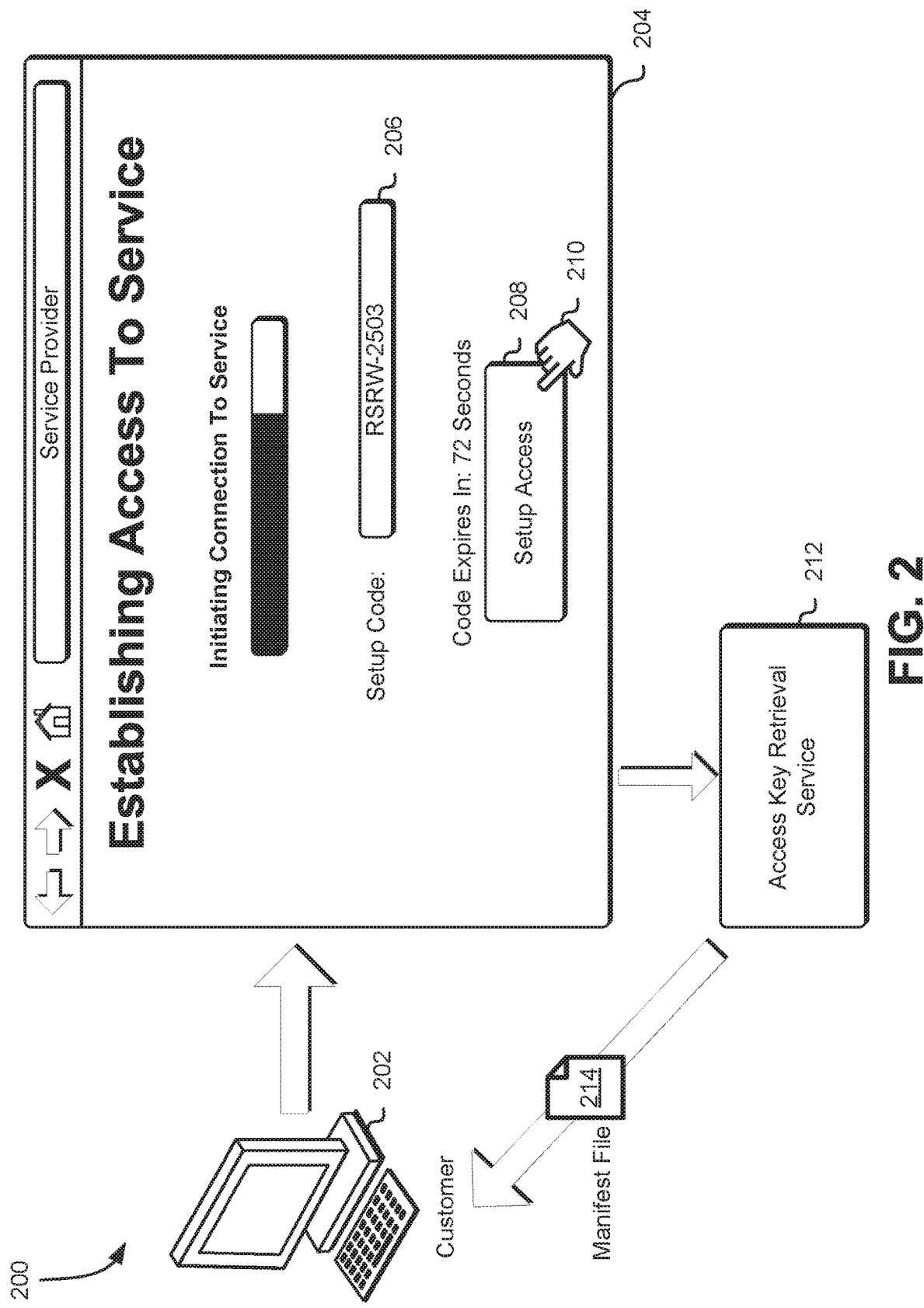
FIG. 2 shows an illustrative example of an environment in which a customer, through a client device, utilizes a graphical user interface of an access key retrieval service to obtain a manifest file and a setup code for generation of an authentication key in accordance with at least one embodiment.

As noted above, a customer, through a customer client device, may access an access key retrieval service to obtain a setup code and a manifest file that may be used to derive a cryptographic (e.g., authentication) key. This authentication key may be used to enable a local development environment of the customer client device or other applications installed on the customer client device to be authenticated by the access key retrieval service and to obtain an access key or secret that may be used to access computing resources and services provided by a computing resource service provider. Accordingly, FIG. 2 shows an illustrative example of an environment 200 in which a customer, through a customer client device 202, utilizes a GUI 204 of an access key retrieval service 212 to obtain a manifest file 214 and a setup code for generation of an authentication key in accordance with at least one embodiment.

In the environment 200, a customer, through a customer client device 202, may access an access key retrieval service 212 as part of a process to obtain tiles and other information that may be used to install one or more applications onto the customer client device 202 or to otherwise enable the customer client device 202 to access computing resources and services provided by the computing resource service provider. The access key retrieval service 212 may provide customers with an interface, such as a GUI 204, which the customer may utilize to obtain information that can be used to generate an authentication key for obtaining an access key or secret that can be used by the customer computer client 202 to access these computing resources and services. The GUI 204 may include one or more elements that may be used by the customer to obtain information necessary to generate the authentication key. For instance, as illustrated in FIG. 2, the GUI 204 may include a setup code window 206, which the access key retrieval service 212 may update to display a unique setup code. For instance, the access key retrieval service 212 may update the HyperText Markup Language (HTML) of the GUI 204 and transmit the updated GUI 204 to the client device. Alternatively, the access key retrieval service 212 may transmit data to the client device to cause the client device to display the setup code. The customer may use this setup code as part of a setup process for enabling its local development environment or other applications to access computing resources and services of the computing resource service provider. In some examples, the setup code is a one-time code comprising various characters, such as alpha-numeric characters and/or symbols. In some embodiments, the setup code presented through the setup code window 206 may be configured to be easy for a person to recall (e.g., easy to memorize, enable rapid recollection, etc.).

In some embodiments, the setup code may have a short-duration (e.g., a few minutes, etc.) such that the setup code may expire if not utilized within an expiration period defined by the access key retrieval service. Through the GUI 204, the access key retrieval service 212 may provide the customer with the remaining validity period for the setup code. As the validity period for the setup code decreases, the access key retrieval service 212 may update the GUI 204 to present the remaining validity period for the setup code. If the setup code expires, the access key retrieval service 212 may generate a new setup code and update the setup code window 206 of the GUI 204 to present the new setup code. Alternatively, the access key retrieval service 212 may update the GUI to indicate that the setup code has expired and to instruct the customer to re-initiate the process for generating the authentication key (e.g., terminate the existing session with the access key retrieval service 212 and initiate a new session, etc.).

As described above, the setup code may serve as a component of the authentication key that may be used to authenticate the customer client device 202. In order to setup access for the customer client device 202 to computing resources or services provided by the computing resource service provider, the access key retrieval service 212 may provide a manifest file 214 to the customer client device 202 that includes another component of the authentication key. For instance, through the GUI 204, the access key retrieval service 212 may provide the customer with a setup access button 208. The customer may utilize a cursor 210 or other interface device to select the setup access button 208. In response to selection of the setup access button 208, the access key retrieval service 212 may generate a manifest file 214, which may include metadata corresponding to any accompanying files provided by the access key retrieval service 212 that may be used to install the one or more applications on to the local development environment on the customer client device 202. Additionally, the manifest file 214 may describe the name, version number, files, and other information that may constitute the one or more applications included in the accompanying files provided by the access key retrieval service 212.

In an embodiment, the manifest file 214 includes a header comprising another component of the authentication key that can be used for authentication of the customer client device 202. The component of the authentication key may be insufficient to be usable for authentication of the customer client device 202. The customer client device 202 may combine the component of the authentication key in manifest file 214 with the setup code presented in the setup code window 206, to generate the authentication key usable to authenticate the customer client device 202. To generate the component of the authentication key provided in the manifest file 214, the access key retrieval service 212 may rely on one or more secret sharing schemes to enable the customer client device 202 to derive the cryptographic key from the component of the authentication key provided in the manifest file 214 and the setup code. Example secret sharing schemes may include Shamir's scheme, Blakley's scheme, the Chinese remainder theorem, and the like. Alternatively, the derivation of the authentication key may include a combination of bits of the header in the manifest file 214 and the setup code.

In some embodiments, the access key retrieval service 212 defines a validity period for the manifest file 214 such that the manifest file 214 is expired if the validity period has elapsed. The access key retrieval service 212 may specify, in the manifest file 214, a time at which the validity period is set to expire. Thus, the customer client device 202 may evaluate the manifest file 214 to determine whether the manifest file 214 is valid for use in generating the authentication key. If the manifest file 214 is no longer valid, the customer client device 202 may prompt the customer to initiate a new session with the access key retrieval service 212 to obtain a new setup code and manifest file 214. Alternatively, the customer may select the setup access button 208 through the GUI 204 to download a new manifest file 214.

The access key retrieval service 212 may utilize the component of the authentication key in the manifest file 214 and the setup code to generate a reference authentication key, which may expire when either the manifest file 214 or the setup code has expired. The reference authentication key may be used by the access key retrieval service 212 to determine whether an authentication key or other information usable to prove access to the authentication key provided by the customer client device 202 is valid. In some instances, the access key retrieval service 212 may store a copy of the manifest file 214 and the setup code within a local (e.g., relative to the access key retrieval service 212) datastore. Thus, in response to receiving an authentication key from the customer client device 202, the access key retrieval service 212 may utilize its copy of the manifest file 214 and the setup code to derive the reference authentication key for verification.

Figure 3:
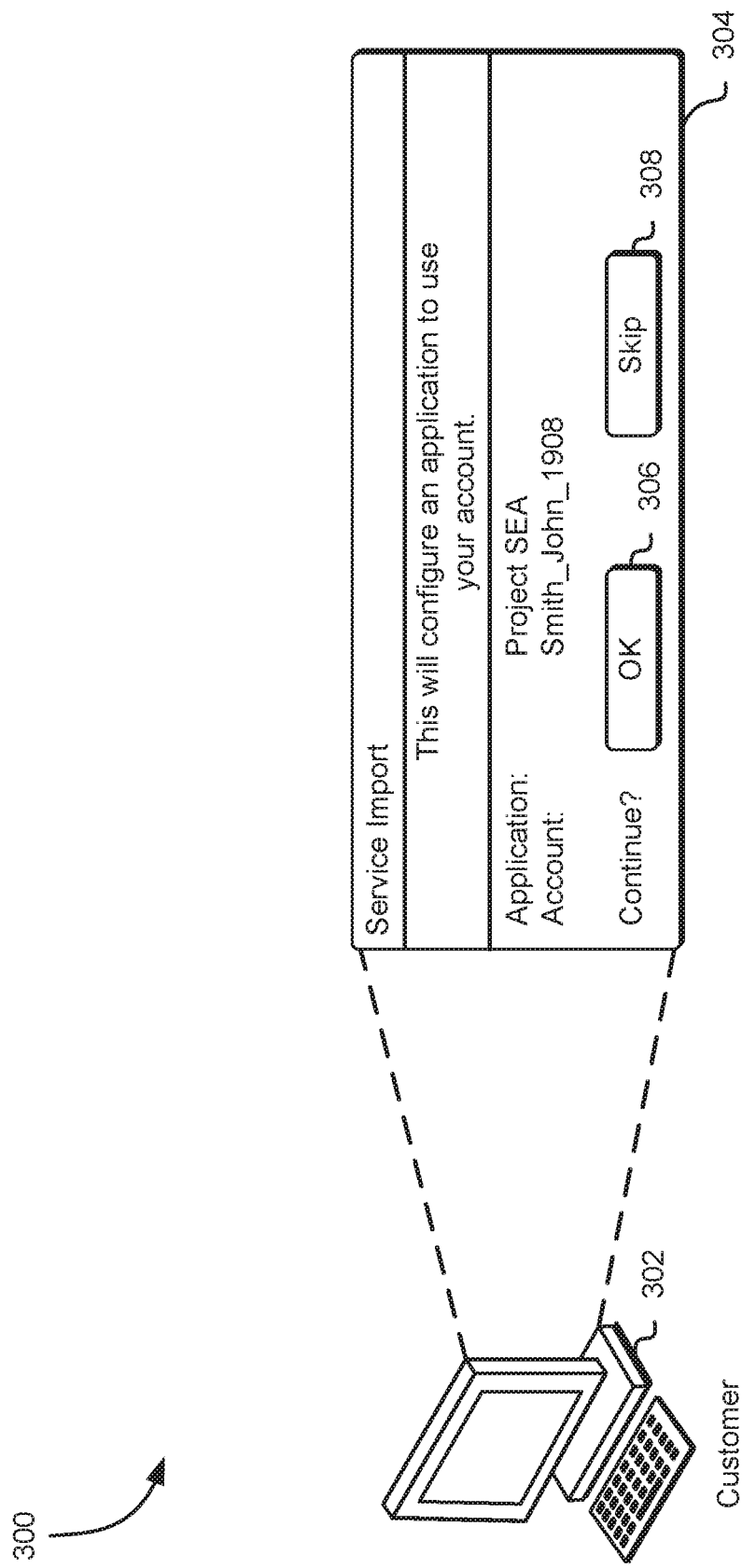
FIG. 3 shows an illustrative example of an environment in which a local development environment of a customer client device prompts a user of the customer client device to initiate configuration of an application to be installed on the customer client device in accordance with at least one embodiment.

As noted above, in response to receiving the manifest file and other pertinent files from the access key retrieval service, the local development environment of the customer client device may launch a GUI to initiate a setup process for the one or more applications to be installed on the customer client device or for other settings usable to enable the local development environment or other applications installed on the customer client device to access computing resources and services of the computing resource service provider. The customer may interact with the GUI to cause the customer client device to utilize the files provided by the access key retrieval service to perform one or more operations, including installation of one or more applications, configuring the local development environment to access services and computing resources of the computing resource service provider, and the like. Accordingly, FIG. 3 shows an illustrative example of an environment 300 in which a local development environment of a customer client device 302 prompts a user of the customer client device 302 to initiate configuration of an application to be installed on the customer client device 302 in accordance with at least one embodiment.

In the environment 300, the customer client device 302 may include a local development environment, which may obtain the manifest file and other files from the access key retrieval service in response to customer interaction with a GUI of the access key retrieval service. The local development environment may be an integrated development environment (IDE), which is an application installed on the customer client device 302 configured to enable users of the IDE to create, modify, and test software applications to support a customer's needs. The customer may use the local development environment to configure applications for accessing computing resources and services of the computing resource service provider. Thus, the customer may obtain files from the access key retrieval service that may be used to configure these applications to access the computing resource service provider. The files from the access key retrieval service may also be used to install applications and configurations that may be used to supplement the local development environment installed on the customer client device 302.

In response to receiving the manifest file from the access key retrieval service, the local development environment may present to the customer, through the customer client device 302, a GUI 304 that may be used to initiate configuration of one or more applications to be installed on the customer client device 302 or to update the configuration of the local development environment. It should be noted that while GUIs are used extensively throughout the present disclosure, other interfaces may be utilized for configuration of the one or more applications or for updating the configuration of the local development environment. For instance, the local development environment may present the customer, through the customer client device 302, with a command prompt, which may present the customer with a command line for inputting commands to the local development environment. Through this command prompt, the local development environment may update the customer as to the changes made to the configuration of the local development environment or as to the installation of the one or more applications.

Through the GUI 304, the local development environment may present the customer with various options for configuring the one or more applications to be installed on the customer client device 302 or the local development environment itself. For instance, the local development environment may update the GUI 304 to present the customer with the name of each application or configuration file that is to be installed on the customer client device 302. As an example, the GUI 304 has been updated to indicate that the application "Project SEA" is to be installed on the customer client device 302. Through the GUI 304, the local development environment may present other information regarding the application or configuration that is to be implemented. This may include, but is not limited to, the size of the application or configuration, the system requirements for the application or configuration, estimated time for installation, version numbers, and the like.

In addition to information regarding the application or configuration to be installed on the customer client device 302, the local development environment may update the GUI 304 to present customer account information for the customer's computing resource service provider account. As illustrated in FIG. 3, this information may include the customer account name that is associated with the application or configuration to be installed on the customer client device 302, although the GUI 304 may be updated to include additional account information, such as access privileges associated with the account, contact information on file for the account, and the like.

The local development environment may provide, through the GUI 304, one or more options to the customer for initiating configuration of the one or more applications for accessing the computing resources and services provided by the computing resource service provider. For instance, the local development environment may present, through the GUI 304, an OK button 306. If the customer selects the OK button 306, the local development environment may initiate installation of the one or more applications or configuration files from the access key retrieval service and initiate the process for obtaining the access key or secret for enabling the one or more applications or the local development environment to access computing resources or services of the computing resource service provider. As described below, this may include prompting the customer to provide the setup code presented by the access key retrieval service and deriving the authentication key using the setup code and the manifest file.

In addition to the OK button 306, the local development environment may update the GUI 304 to present a skip button 308. If the customer selects the skip button 308, the local development environment may install the one or more applications or configuration without initiating the process for obtaining the access key or secret from the computing resource service provider. Thus, the applications or local development environment on the customer client device 302 may be unable to access the computing resources and services provided by the computing resource service provider if the customer selects the skip button 308. However, the customer, through the customer client device 302, may update the configuration of the installed applications or local development environment at a later time to initiate the process for obtaining the access key or secret to enable these applications or the local development environment to access the computing resources and services of the computing resource service provider. While the GUI 304 includes an OK button 306 and a skip button 308 that can be selected by the customer, other buttons or elements may be included to enable additional customer interaction with the GUI 304. For instance, the GUI 304 may include a cancel button that, if selected, may terminate the process for installation of the one or more applications or configurations.

Figure 4:
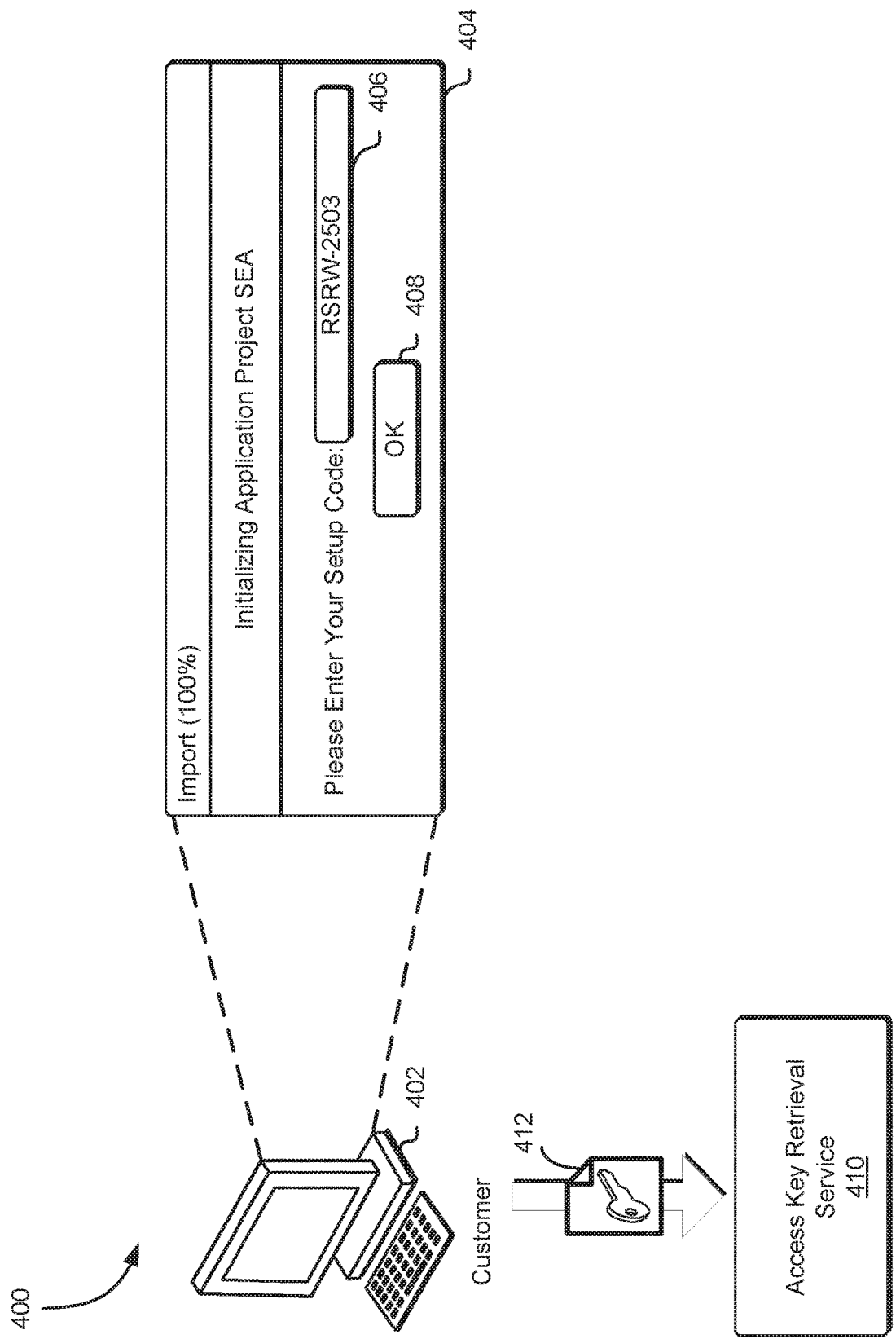
FIG. 4 shows an illustrative example of an environment in which a local development environment of a customer client device generates an authentication key for authentication of the customer client device in accordance with at least one embodiment.

As noted above, if the customer selects the OK button from the GUI described above in connection with FIG. 3, the local development environment of the customer client device may update the GUI to prompt the customer to provide the setup code presented to the customer by the access key retrieval service. If the customer provides its setup code to the local development environment through the GUI, the local development environment may use the setup code and the manifest file obtained from the access key retrieval service to derive an authentication key. This authentication key may be used to authenticate the customer, the local development environment, and/or the one or more applications that are to access the computing resources and services of the computing resource service provider. Accordingly, FIG. 4 shows an illustrative example of an environment 400 in which a local development environment of a customer client device 402 generates an authentication key 412 for authentication of the customer client device 402 in accordance with at least one embodiment.

In the environment 400, the local development environment may present, through the customer client device 402, a GUI 404 for enabling a customer to input the setup code provided by the access key retrieval service. For instance, the GUI 404 may include a setup code input field 406, which a user of the customer client device 402 may utilize to input the setup code obtained from the access key retrieval service. The user may enter the one or more characters for the setup code into the setup code input field 406, which may be displayed to the customer via the GUI 404. The GUI 404 may further include an OK button 408, which, if selected, may cause the GUI 404 to provide the setup code inputted into the setup code input field 406 to the local development environment.

In response to receiving the setup code from the customer through the GUI 404, the local development environment may obtain the component of the authentication key from the manifest file and combine this component of the authentication key with the setup code according to a secret sharing scheme described above or other combination method (e.g., combining of bits, etc.) to derive the authentication key 412. The local desktop environment of the customer client device 402 may transmit the authentication key 412 or information that cryptographically proves that the customer has access to the authentication key 412 (e.g., digital signature generated using the authentication key 412, a hash of the authentication key 412, etc.) to the access key retrieval service 410. The access key retrieval service 410 may utilize the received authentication key 412 or information from the customer client device 402 to determine whether the customer client device 402 can be authenticated.

In some embodiments, in response to receiving the setup code from the customer through the GUI 404, the local development environment transmits both the setup code and the component of the authentication key from the manifest file to the access key retrieval service 410. The access key retrieval service 410 may utilize the setup code and the component of the authentication key provided by the customer client device 402 to derive the authentication key 412. The access key retrieval service 410 may utilize this derived authentication key 412 to determine whether the customer client device 402 can be authenticated. Alternatively, the access key retrieval service 410 may determine whether either the setup code or the component of the authentication key provided by the customer client device 402 is valid.

Figure 5:
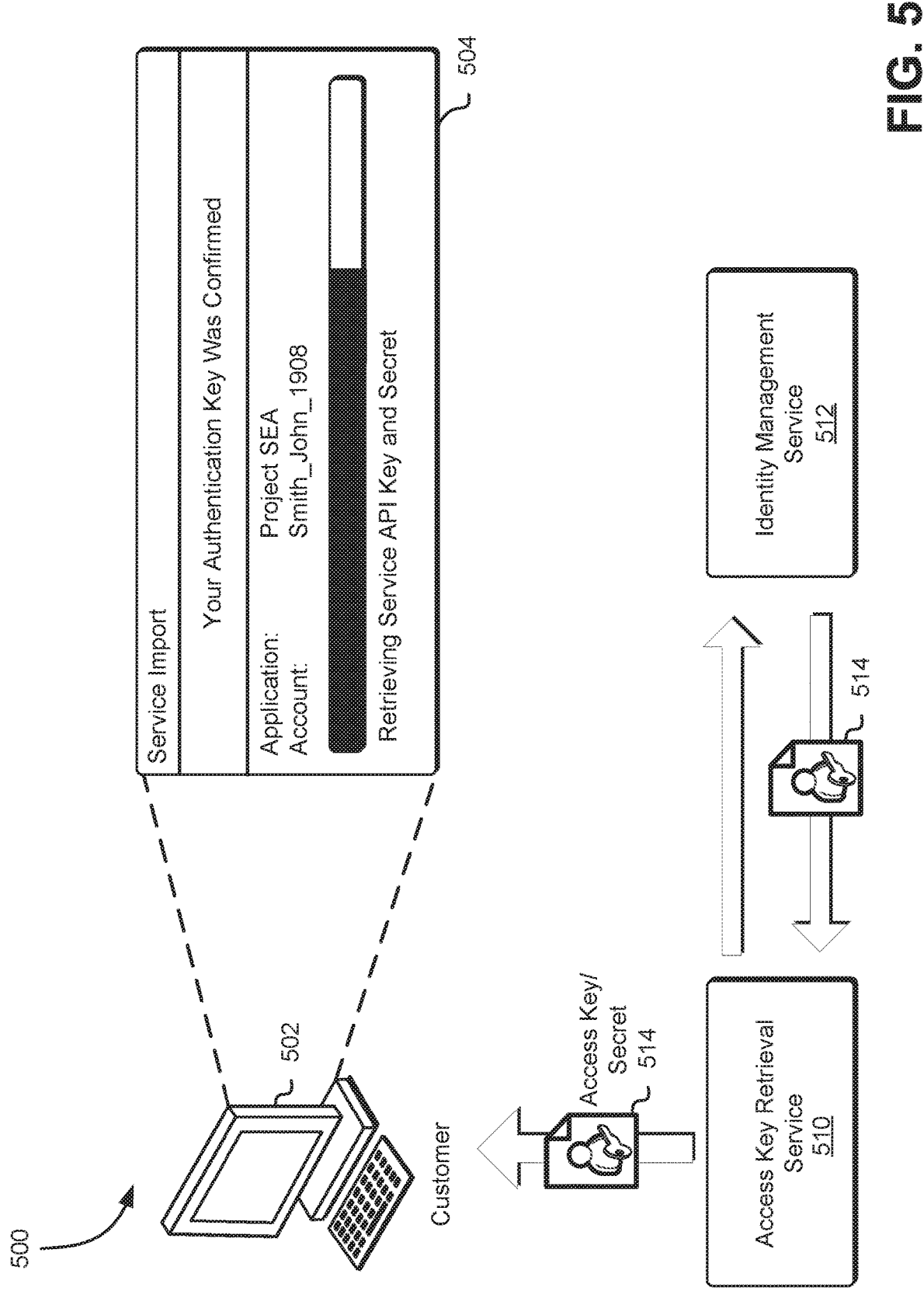
FIG. 5 shows an illustrative example of an environment in which an access key retrieval service provides an access key or secret usable to access computing resources of a computing resource service provider to a customer client device in accordance with at least one embodiment.

In an embodiment, if the access key retrieval service determines that the authentication key derived by the local development environment or derived by the access key retrieval service using the setup code and the component of the authentication key provided by the customer client device is valid, the access key retrieval service transmits a notification to the customer client device to indicate that the authentication key has been validated. This may cause the local development environment to update the GUI to specify that the authentication key has been confirmed by the access key retrieval service. Additionally, the access key retrieval service may transmit a request to the identity management service of the computing resource service provider to obtain an access key or secret that may be used by the local development environment or the one or more applications installed on the customer client device to access the computing resources and services of the computing resource service provider, subject to one or more policies applicable to the customer's account. Accordingly, FIG. 5 shows an illustrative example of an environment 500 in which an access key retrieval service 510 provides an access key or secret 514 usable to access computing resources of a computing resource service provider to a customer client device 502 in accordance with at least one embodiment.

In the environment 500, if the access key retrieval service 510 determines that the authentication key derived by the local development environment of the customer client device 502 is valid, the access key retrieval service 510 may transmit a request to the identity management service 512 to obtain an access key or secret 514 that can be used for authentication and authorization purposes. In the request, the access key retrieval service 510 may include information regarding the customer, such as a customer identifier and credential information that may have been previously provided by the customer as part of an authentication process by the access key retrieval service 510. Additionally, the access key retrieval service 510 may provide information regarding the applications or the local development service that will be using the access key or secret 514 to access the computing resources and services provided by the computing resource service provider.

Based at least in part on the information provided by the access key retrieval service 510, the identity management service 512 may access the customer account of the customer to identify any applicable policies, including policies defined by the customer that are specific to the one or more applications or local development environment on the customer client device 502. For instance, a customer may access the identity management service 512 to create and manage one or more users and groups that may utilize the services provided by the computing resource service provider. A customer may utilize the identity management service 512 to generate one or more policies, which may be used to define a level of access to resources and services. Additionally, for each customer and user of the services provided by the computing resource service provider, the identity management service 512 may maintain an access key or secret, which may be compared to the access key or secrets provided by the applications or local development environment of the customer client device 502 to authenticate the applications or local development environment prior to enabling access to any other service provided by the computing resource service provider.

In response to the request from the access key retrieval service 510, the identity management service 512 may provide the access key or secret 514 to the access key retrieval service 510. This may cause the access key retrieval service 510 to transmit the access key or secret 514 to the customer client device 502 for use by the local development environment or other applications installed on the customer client device 502 to digitally sign requests for access to the computing resources and services of the computing resource service provider. The local development environment, in response to receiving the access key or secret 514 from the access key retrieval service 510, may update the GUI 504 presented through the customer client device 502 to indicate that the access key or secret 514 has been received. In some embodiments, as the access key retrieval service 510 communicates with the identity management service 512 to obtain the access key or secret 514 from the identity management service 512, the access key retrieval service 510 provides notifications to the customer client device 502 to indicate the status of retrieval of the access key or secret 514. This may cause the local development environment to update the GUI 504 to indicate the status of retrieval of the access key or secret 514.

Figure 6:
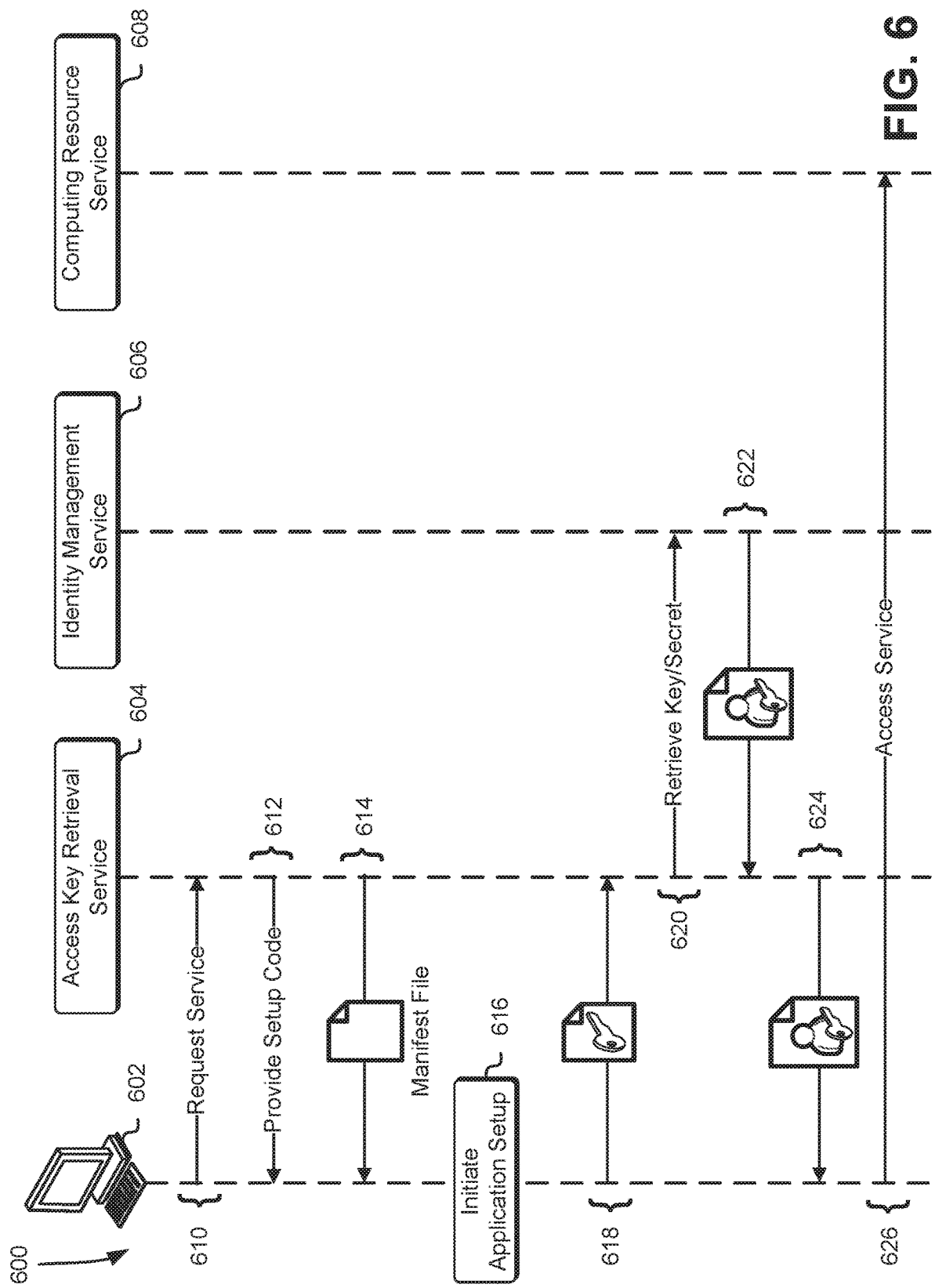
FIG. 6 shows an illustrative example of a diagram of a process flow for obtaining an access key or secret that can be used by an application or local development environment of a customer client device to access a computing resource service in accordance with at least one embodiment.

FIG. 6 shows an illustrative example of a diagram 600 of a process flow for obtaining an access key or secret that can be used by an application or local development environment of a customer client device 602 to access a computing resource service 608 in accordance with at least one embodiment. In the process flow illustrated through the diagram 600, a customer, through the customer client device 602, may transmit 610 a request to the access key retrieval service 604 to access the service. For instance, a customer, through a customer client device 602, may access the access key retrieval service 604 as part of a process to obtain files and other information that may be used to install one or more applications onto the customer client device 602 or to otherwise enable the customer client device 602 to access computing resources and services provided by the computing resource service provider. The access key retrieval service 604 may provide customers with an interface, which the customer may utilize to select applications to be installed on the client device 602 and to obtain information that can be used to generate an authentication key for obtaining an access key or secret that can be used by the client device 602 to access these computing resources and services. Through the interface, the access key retrieval service 604 may provide 612 a setup code, which may be used as part of a setup process for enabling a local development environment or other applications on the customer client device 602 to access computing resources and services of the computing resource service provider.

In addition to providing the setup code through the interface, the access key retrieval service 604 may provide 614 a manifest file and other files to the customer client device 602. These files may be utilized by the customer client device 602 to initiate 616 installation and setup of one or more applications as selected by the customer through the interface of the access key retrieval service 604. For instance, the local development environment of the customer client device 602 may present the user of the customer client device 602 with an interface to allow the user to configure installation of the one or more applications or settings for the local development environment. Additionally, through the interface, the local development environment may prompt the user of the customer client device 602 to provide the setup code provided to the user by the access key retrieval service 604. If the user provides the setup code through the interface, the local development environment may utilize the setup code and the manifest file from the access key retrieval service 604 to derive an authentication key. This authentication key may be used by the access key retrieval service 604 to authenticate the customer client device 602, the local development environment, and/or the one or more applications that are to access the computing resources and services provided by the computing resource service provider.

In some embodiments, the customer, through the customer client device 602, can transmit 610 the request to any computing resource service to access this service. Through this computing resource service, the customer may submit a request to obtain files and other information that may be used to install the one or more applications onto the customer client device 602. In response to this request, the computing resource service may transmit a request to the access key retrieval service 604 to obtain a setup code and the manifest file. The access key retrieval service 604 may provide the setup code and manifest file to the computing resource service, which may transmit the setup code and manifest file to the customer client device 602.

The local development environment may transmit 618, through the customer client device 602, the authentication key to the access key retrieval service 604. In an embodiment, the access key retrieval service 604 evaluates the authentication key to determine whether the authentication key is valid. For instance, as described above, the setup code and the manifest file provided to the customer may each be subject to a validity period defined by the access key retrieval service 604. If the validity period for either the setup code or the manifest file has elapsed, the setup code or the manifest file may be considered to have expired. Thus, any authentication keys derived using an expired setup code or manifest file may also be considered expired or invalid by the access key retrieval service 604.

If the access key retrieval service 604 determines that the authentication key from the customer client device 602 is valid and the local development environment is authenticated, the access key retrieval service 604 may transmit 620 a request to the identity management service 606 to retrieve an access key or secret that can be used by the identity management service 606 to authenticate the customer client device 602. In the request, the access key retrieval service 604 may provide information regarding the customer, such as a customer identifier and credential information that may have been previously provided by the customer as part of an authentication process by the access key retrieval service 604. Additionally, the access key retrieval service 604 may provide information regarding the applications or the local development service that will be using the access key or secret to access the computing resources and services provided by the computing resource service provider.

In response to the request from the access key retrieval service 604, the identity management service 606 may generate the access key or secret that can be used by the applications or local development environment of the customer client device 602 to access a computing resource service 608. The identity management service 606 may transmit 622 the access key or secret to the access key retrieval service 604 to fulfill the request from the access key retrieval service 604. In response to receiving the access key or secret from the identity management service 606, the access key retrieval service 604 may transmit 624 the access key or secret to the customer client device 602. The local development environment or other application on the customer client device 602 may utilize the access key or secret to access 626 a computing resource service 608 provided by the computing resource service provider. For instance, through the request, the local development environment or application may provide the access key or secret, which may be used for authentication. The request for access to the computing resource service 608 may be a digitally signed request and, as a result, may be provided with a digital signature generated using the access key or secret. The computing resource service 608 may send the request and the digital signature for verification to the identity management service 606. The identity management service 606 may verify that the digital signature is valid to determine whether the local development environment or application can be authenticated. Alternatively, if the request is not digitally signed, the identity management service 606 may evaluate the provided access key or secret to determine whether the access key or secret is valid. If so, the identity management service 606 may authenticate the local development environment or application.

In some embodiments, the identity management service 606 also obtains, based at least in part on the request, one or more policies that are applicable to the received request. The identity management service 606 may provide the authentication decision and the one or more policies to the computing resource service 608, which may use the one or more policies to determine whether the local development environment or application is authorized to perform the requested actions. Thus, the computing resource service 608 may obtain the one or more policies applicable to the request from the identity management service 606 to determine whether the local development environment or application is authorized to access the computing resource service 608 and to perform the requested actions. If so, the computing resource service 608 may allow the local development environment or application to perform the requested actions.

Figure 7:
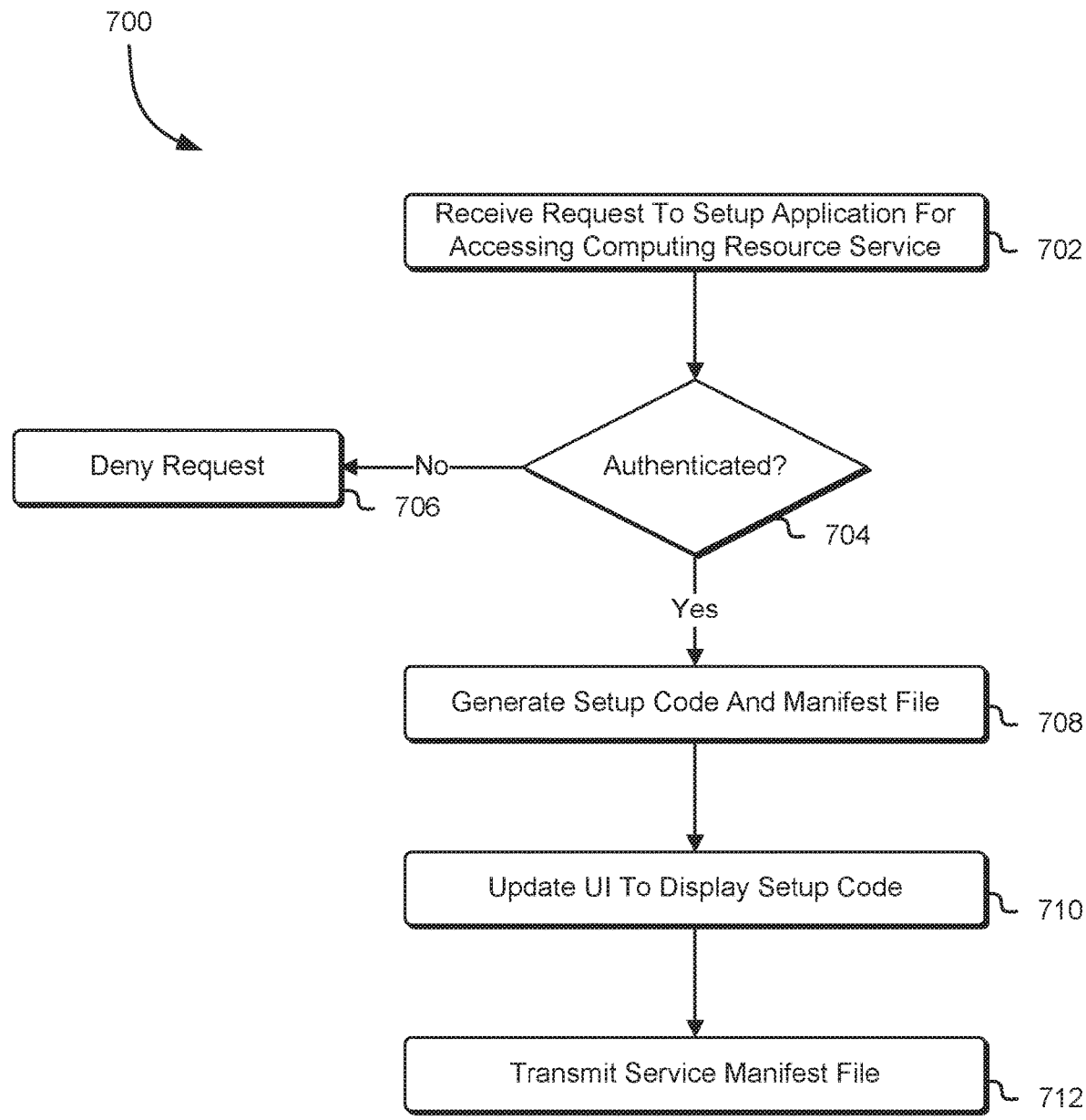
FIG. 7 shows an illustrative example of a process for providing a manifest file and setup code for generating an authentication key in accordance with at least one embodiment.

As noted above, a customer, through a customer client device, may access an access key retrieval service to select one or more applications that can be installed on the customer client device and that can be used to access computing resources and services provided by the computing resource service provider. In addition to providing the files that may be used to install these one or more applications, the access key retrieval service may provide a temporary setup code and a manifest file to the customer. The temporary setup code and the manifest file may be used to derive an authentication key, which can be used by the one or more applications to access the access key retrieval service for obtaining an access key or secret that can be used to access the computing resources and services of the computing resource service provider. Accordingly, FIG. 7 shows an illustrative example of a process 700 for providing a manifest file and setup code for generating an authentication key in accordance with at least one embodiment. The process 700 may be performed by the aforementioned access key retrieval service, which may process incoming requests to obtain files for installation of applications and configurations for a local development environment of a customer client device.

A customer of a computing resource service provider may utilize its customer client device to access an access key retrieval service in order to select one or more applications that may be installed on the customer client device to support the customer's needs. The access key retrieval service, in conjunction with other services provided by the computing resource service provider that provide applications to customers, may present the customer with an interface through which the customer may select the one or more applications that the customer wants installed on its customer client device. Thus, through this interface, the access key retrieval service may receive 702 a request to initiate setup of one or more applications that can be used to access computing resources and services provided by the computing resource service provider.

In response to the request, the access key retrieval service may determine 704 whether the request can be authenticated. For instance, in order for the customer to interact with the access key retrieval service of the computing resource service provider, the customer may be required to provide credential information for authentication to the interface of the access key retrieval service, whereby the interface may utilize the provided credential information to authenticate the customer. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like. The access key retrieval service may utilize the obtained credential information from the interface to authenticate the customer. Alternatively, the access key retrieval service may transmit the credential information to an authentication service of the computing resource service provider to receive an authentication decision. If the request cannot be authenticated (e.g., the credential information is invalid, does not correspond to the customer making the request, etc.), the access key retrieval service may deny 706 the request.

If the request is successfully authenticated, the access key retrieval service may generate 708 a unique setup code that may be presented to the customer via the interface, as well as a manifest file that includes a component of the authentication code usable for authentication of the customer and other configuration files for setting up the application. This setup code may have a short-duration (e.g., a few minutes, etc.) such that the setup code may expire if not utilized within an expiration period defined by the access key retrieval service. Additionally, the setup code may serve as a component of an authentication key that may be used to authenticate the one or more applications that may attempt to access computing resources and services provided by the computing resource service provider. The access key retrieval service may generate the setup code at random or may utilize one or more algorithms to generate the setup code. For instance, the access key retrieval service may rely on one or more secret sharing schemes to generate the setup code such that the setup code may be combined with another component of the authentication key according to the one or more secret sharing schemes to derive the authentication code. The access key retrieval service may update 710 the interface to display the setup code. This may include presenting the setup code using a GUI such as the GUI presented in FIG. 2. Alternatively, if the customer utilizes a command line interface (CLI) to access the access key retrieval service, the access key retrieval service may update the CLI to present the setup code to the customer.

Through the interface, the customer may also select an interface element, such as a button (e.g., setup access button 208 as illustrated in FIG. 2) or may also enter a command into the CLI to request the manifest file for installing the one or more applications on to the customer client device. In response to this request, the access key retrieval service may transmit 712 the manifest file to the customer client device for installation. The manifest file may include metadata corresponding to any accompanying files that may be used to install the one or more applications on to the local development environment on the customer client device. Additionally, the manifest file may describe the name, version number, files, and other information that may constitute the one or more applications included in the accompanying provided by the access key retrieval service. In an embodiment, the manifest file includes a header comprising another component of an authentication key that can be used for authentication of the customer client device. The component of the authentication key may be insufficient to be usable for authentication of the customer client device. The component of the authentication key specified in the manifest file may be combined with the setup code to derive the authentication key usable to authenticate the customer client device.

Figure 8:
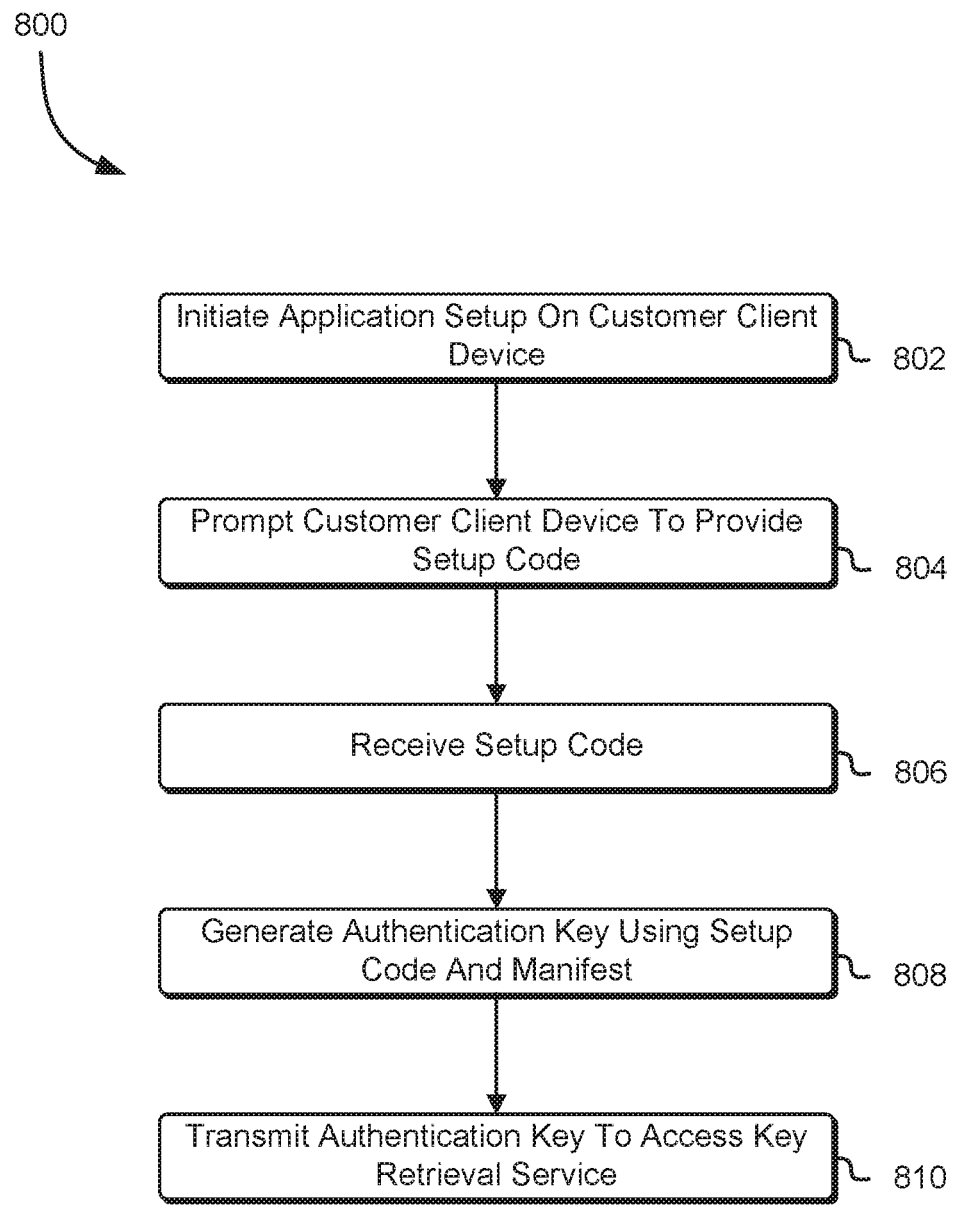
FIG. 8 shows an illustrative example of a process for generating an authentication key using the manifest file and a setup code provided by a user of a customer client device in accordance with at least one embodiment.

As noted above, the customer client device may include a local development environment, such as an IDE, that may utilize the manifest file and other files obtained from the access key retrieval service to install one or more applications on to the customer client device. These one or more applications may be used in conjunction with computing resources and services of the computing resource service provider for the customer's needs. The local development environment may utilize the manifest file and a setup code provided by the customer to derive the authentication key that can be used to authenticate the one or more applications as these applications attempt to obtain an access key or secret from the computing resource service provider for accessing computing resources and services of the computing resource service provider. Accordingly, FIG. 8 shows an illustrative example of a process 800 for generating an authentication key using the manifest file and a setup code provided by a user of a customer client device in accordance with at least one embodiment. The process 800 may be performed by a local development environment or other application of the customer client device that may be configured to install one or more applications from the access key retrieval service.

As described above, in response to a customer request to obtain the one or more application files for installing the one or more applications on to the customer client device. In response to this request, the access key retrieval service may transmit a manifest file and the one or more application setup files to the customer client device for installation. The local development environment of the customer client device, which may receive the manifest file and the one or more application setup files, may initiate 802 setting up (e.g., installation of) the one or more applications to be installed on to the customer client device. In some embodiments, the local development environment presents, through the customer client device, an interface that may be used to alert the customer about the application installation experience. This interface may be updated to specify the names of the applications to be installed on the customer client device, as well as customer account information for the customer's computing resource service provider account.

In an embodiment, the local development environment prompts 804 the customer, through the interface presented via the customer client device, to provide the setup code obtained from the access key retrieval service. For instance, the local development environment may present, through the customer client device, a GUI for enabling a customer to input the setup code provided by the access key retrieval service. The GUI may include a setup code input field, which a user of the customer client device may utilize to input the setup code obtained from the access key retrieval service. The user may enter the one or more characters for the setup code into the setup code input field, which may be displayed to the customer via the GUI. If the local development environment utilizes a CLI, the local development environment may update the CLI to prompt the user to provide the setup code through the CLI.

In response to customer input of the setup code into the interface, the local development environment may receive 806 the setup code and generate 808 the authentication key using the received setup code and the manifest file from the access key retrieval service. For instance, in response to receiving the setup code from the customer, the local development environment may obtain the component of the authentication key from the manifest file (e.g., from a header of the manifest file, etc.) and combine this component of the authentication key with the setup code according to a secret sharing scheme described above or other combination method (e.g., combining of bits, etc.) to derive the authentication key. The local desktop environment of the customer client device may transmit 810 the authentication key or information that cryptographically proves that the customer has access to the authentication key to the access key retrieval service. The access key retrieval service may utilize the received authentication key or information from the customer client device to determine whether the customer client device can be authenticated.

It should be noted that the process 800 may be performed using additional, fewer, or alternative operations. For instance, in some embodiments, the local development environment transmits the setup code and the component of the authentication key from the manifest file to the access key retrieval service without generating the authentication key. Thus, the access key retrieval service may evaluate the setup code and the component of the authentication key from the manifest file to determine whether either is valid without having to generate the authentication key itself.

Figure 9:
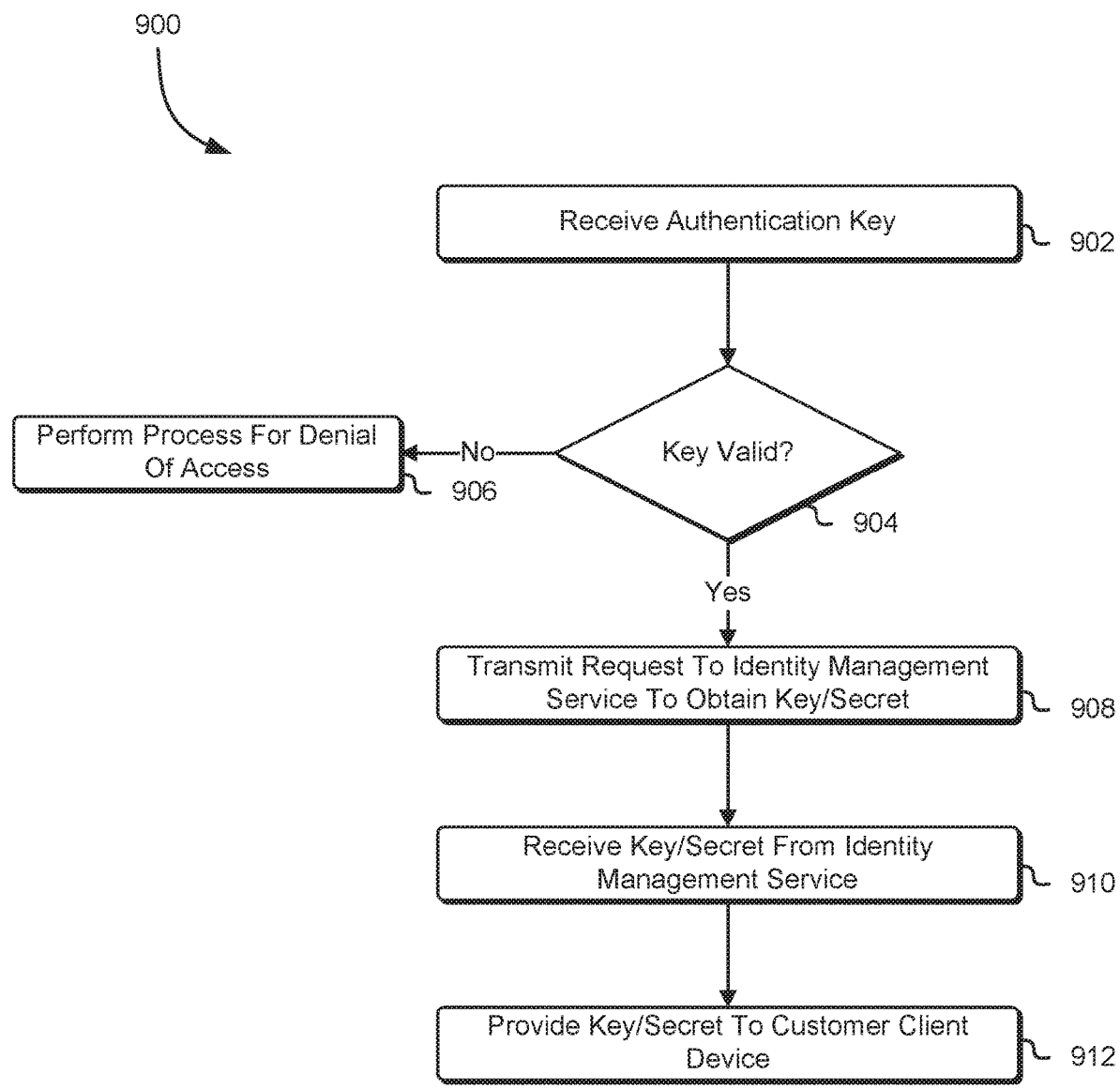
FIG. 9 shows an illustrative example of a process for providing an access key or secret usable to access a computing resource service in response to receiving an authentication key from a customer client device in accordance with at least one embodiment.

As noted above, the access key retrieval service may evaluate an authentication key from a customer client device to determine whether it is valid and, if so, whether the customer client device may be authenticated. If so, the access key retrieval service may transmit a request to an identity management service of the computing resource service provider to obtain an access key or secret that may be provided to the customer client device. This access key or secret may be utilized by the one or more applications installed on the customer client device to access the computing resources and services provided by the computing resource service provider. Accordingly, FIG. 9 shows an illustrative example of a process 900 for providing an access key or secret usable to access a computing resource service in response to receiving an authentication key from a customer client device in accordance with at least one embodiment. The process 900 may be performed by the aforementioned access key retrieval service, which may evaluate incoming authentication keys and transmit requests to the identity management service to obtain access keys or secrets usable by customer client devices to access computing resources and services provided by the computing resource service provider.

At any time, the access key retrieval service may receive 902 an authentication key from a customer client device. As described above, the authentication key may be derived by the customer client device through a combination of a component of the authentication key provided in the manifest file and the setup code provided to the customer by the access key retrieval service. In an embodiment, the access key retrieval service evaluates the authentication key to determine 904 whether the authentication key is valid. For instance, the setup code and the manifest file provided to the customer may each be subject to a validity period defined by the access key retrieval service. If the validity period for either the setup code or the manifest file has elapsed, the setup code or the manifest file may be considered to have expired. Thus, any authentication keys derived using an expired setup code or manifest file may also be considered expired or invalid by the access key retrieval service.

If the access key retrieval service determines that the provided authentication key is not valid, the access key retrieval service may perform 906 a process for denial of access to the access key retrieval service. For instance, the access key retrieval service may transmit a notification to the customer client device to indicate that the request to obtain an access key or secret has been denied. Additionally, or alternatively, the access key retrieval service may transmit a notification to the customer client device indicating that the manifest file and/or the setup code have expired. In some embodiments, the access key retrieval service provides a new setup code and manifest file that can be used to generate a new authentication key.

If the access key retrieval service determines that the provided authentication key is valid and can be used to authenticate the customer client device, the access key retrieval service may transmit 908 a request to an identity management service of the computing resource service provider to obtain an access key or secret that can be utilized by the customer client device. In the request, the access key retrieval service may provide information regarding the customer, such as a customer identifier and credential information that may have been previously provided by the customer as part of an authentication process by the access key retrieval service. Additionally, the access key retrieval service may provide information regarding the applications or the local development service that will be using the access key or secret to access the computing resources and services provided by the computing resource service provider.

In response to the request from the access key retrieval service, the identity management service may generate the access key or secret that can be used by the applications or local development environment of the customer client device to access a computing resource service. The identity management service may transmit the access key or secret to the access key retrieval service to fulfill the request from the access key retrieval service. Thus, the access key retrieval service may receive 910 the access key or secret from the identity management service.

In response to receiving the access key or secret from the identity management service, the access key retrieval service may provide 912 the access key or secret to the customer client device. The local development environment or other application on the customer client device may utilize the access key or secret to access a computing resource service provided by the computing resource service provider. The request for access to the computing resource service may be a digitally signed request and, as a result, may be provided with a digital signature generated using the access key or secret. The computing resource service may send the request and the digital signature for verification to the identity management service. The identity management service may verify that the digital signature is valid to determine whether the local development environment or application can be authenticated. Alternatively, if the request is not digitally signed, the identity management service may evaluate the provided access key or secret to determine whether the access key or secret is valid. If so, the identity management service may authenticate the local development environment or application and enable the customer client device to access the requested computing resources and/or service.

It should be noted that the process 900 may be performed using additional, fewer, or alternative operations than those illustrated in FIG. 9. For instance, in some embodiments, rather than receiving the authentication key from the customer client device, the access key retrieval service receives the setup code and the manifest file from the customer client device. In response to receiving the setup code and the manifest file, the access key retrieval service may determine whether both the setup code and the manifest file are valid. If either the setup code or the manifest file provided by the customer client device is not valid, the access key retrieval service may perform a process for denial of access. Alternatively, the access key retrieval service may use the provided setup code and the manifest file to generate a purported authentication key. The access key retrieval service may compare this purported authentication key to the expected authentication key generated by the access key retrieval service using the setup code and the manifest file provided to the customer client device.

Figure 10:
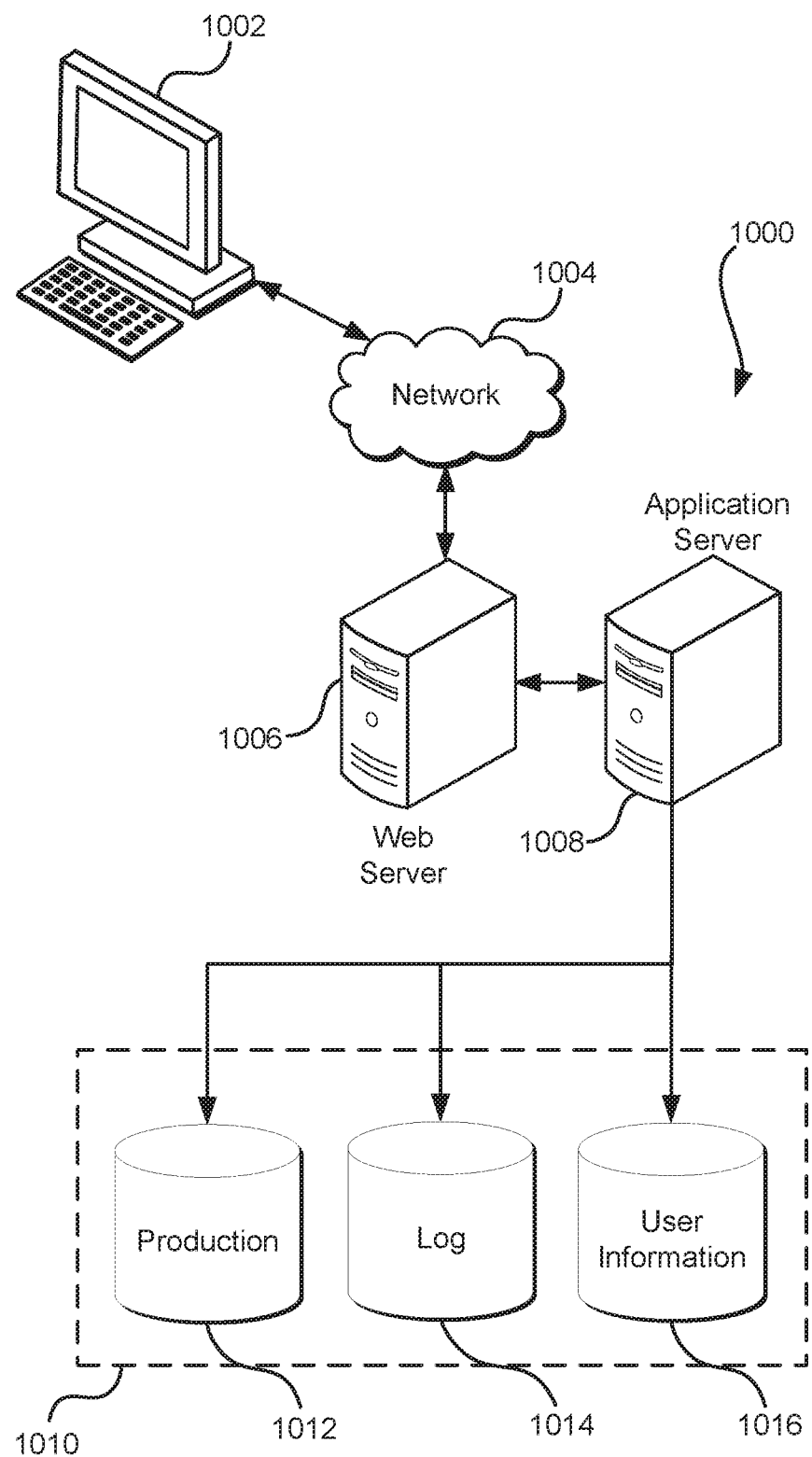
FIG. 10 shows an illustrative example of an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("MS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers. Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as My SQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at leak one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    transmitting, in response to a request to initialize an application executed by a client device, data to the client device to cause an interface displayed on the client device to present a setup code, the setup code corresponding to a first portion of an authentication key and valid for a first interval of time;
    transmitting, to the client device, a manifest file including a second portion of the authentication key and valid for a second interval of time;
    receiving, from the client device, the authentication key generated based at least in part on the first portion of the authentication key and the second portion of the authentication key;
    validating the authentication key; and as a result of validating the authentication key, providing an access key to the client device, the access key used, by the application, to obtain access to a set of computing resources of a service provider.

2. The computer-implemented method of claim 1, wherein validating the authentication key further comprises determining that the first interval of time and the second interval of time have not expired.

3. The computer-implemented method of claim 1, wherein the manifest file further comprises metadata associated with the application useable by the client device to install the application.

4. The computer-implemented method of claim 3, wherein the metadata further comprises at least one of: a name of the application, a version number of the application; additional data used by the application, and information indicating one or more other applications executed by the client device.

5. The computer-implemented method of claim 1, wherein the first portion of the authentication key and the second portion of the authentication key are generated based at least in part on a secret sharing scheme.

6. The computer-implemented method of claim 1, wherein the authentication key is derivable by at least hashing a concatenation of the first portion of the authentication key and the second portion of the authentication key.

7. A system, comprising:
one or more processors; and
memory including instructions that, as a result of being executed by the one or more processors, cause the system to:
receive a request to set up an application executed by a client device to allow the application to access computing resources of a service provider;
in response to the request, provide a setup code and a manifest file, the setup code including a first key component of Man authentication key, the manifest file including a second key component of the authentication key, the setup code and the manifest file subject to a validity interval;
receive information demonstrating access to the authentication key generated based at least in part on the first key component and the second key component; and
as a result of receipt of the information, provide an access key to the application.

8. The system of claim 7, wherein the first key component and the second key component individually are insufficient to authenticate the client device.

9. The system of claim 7, wherein the instructions further comprise instructions that, as a result of being executed by the one or more processors, cause the system to:
obtain proof of access, by the client device, to the setup code;
verify the proof of access to the setup code; and
wherein the instructions that cause the system to provide the manifest file further comprise instructions that, as a result of being executed by the one or more processors, cause the system to provide the manifest file as a result of verifying the proof of access to the setup code.

10. The system of claim 7, wherein the manifest file further comprises executable instructions to install the application on the client device.

11. The system of claim 7, wherein the instructions that cause the system to provide the setup code further comprise instructions that, as a result of being executed by the one or more processors, cause the system to transmit data to the client device to cause an update to an interface displayed on the client device to display the setup code.

12. The system of claim 7, wherein the information demonstrating access to the authentication key further comprises a digital signature generated using the authentication key.

13. The system of claim 7, wherein the instructions that cause the system to provide the access key further comprise instructions that, as a result of being executed by the one or more processors, cause the system to provide the access key as a result of determining that the validity interval is unexpired.

14. The system of claim 7, wherein the instructions further comprise instructions that, as a result of being executed by the one or more processors, cause the system to validate the information demonstrating access to the authentication key prior to providing the access key.

15. The system of claim 7, wherein the manifest file further comprises instructions that are executable by the client device to cause the client device to generate an interface to enable input of the setup code via the interface.

16. A non-transitory computer-readable storage medium storing thereon executable instructions that, as a result of being executed by one or more processors of a computer system, cause the computer system to at least:
provide a first code to a client device, the first code corresponding to a first component of an authentication key and valid during a first interval of time;
provide, as a result of validating the first code during the first interval of time, a manifest to the client device, the manifest including a second component of the authentication key;
obtain information indicating access to the authentication key;
generate a determination that the information indicating access to the authentication key is valid, the authentication key derived by at least using a plurality of key components, the plurality of key components including at least the first component and the second component; and
provide, in response to the determination, a key to the client device.

17. The non-transitory computer-readable storage medium of claim 16, wherein the manifest file further comprises one or more other files to configure an application to provide the client device access to computing resources of a service provider using at least the key.

18. The non-transitory computer-readable storage medium of claim 16, wherein the manifest file further comprises executable instructions that are executable by the client device, that as a result of being executed by the client device, cause the client device to:
obtain the first code through an interface displayed on the client device; and
generate the authentication key by at least combining the first component, included in the first code, with the second component included in the manifest file.

19. The non-transitory computer-readable storage medium of claim 15, wherein the manifest includes instructions that are executable by the client device to cause the client device to provide an interface to enable input of the code in order to derive the authentication key.

20. The non-transitory computer-readable storage medium of claim 16, wherein the manifest further comprises information indicating a secret sharing scheme used to generate the authentication key using at least the first component and the second component.

* * * * *